US011212310B2

(12) United States Patent
Arvanites et al.

(10) Patent No.: US 11,212,310 B2
(45) Date of Patent: Dec. 28, 2021

(54) SYSTEM FOR REDUCING APPLICATION PROGRAMMING INTERFACE (API) RISK AND LATENCY

(71) Applicant: AAPI, Irvine, CA (US)

(72) Inventors: Timothy Arvanites, Irvine, CA (US); Robert Phillips, Irvine, CA (US)

(73) Assignee: AAPI, Irvine, CA (US)

( * ) Notice: Subject to any disclaimer, the term of this patent is extended or adjusted under 35 U.S.C. 154(b) by 390 days.

(21) Appl. No.: 15/967,477

(22) Filed: Apr. 30, 2018

(65) Prior Publication Data

US 2019/0334943 A1 Oct. 31, 2019

(51) Int. Cl.
*H04L 29/06* (2006.01)
*G06F 9/54* (2006.01)
*G06F 16/951* (2019.01)

(52) U.S. Cl.
CPC .......... *H04L 63/1433* (2013.01); *G06F 9/547* (2013.01); *G06F 16/951* (2019.01); *H04L 63/0876* (2013.01)

(58) Field of Classification Search
CPC ............. H04L 63/1433; H04L 63/0876; G06F 16/951; G06F 9/547
See application file for complete search history.

(56) References Cited

U.S. PATENT DOCUMENTS

| | | | | |
|---|---|---|---|---|
| 8,082,491 B1* | 12/2011 | Abdelaziz | ........... | G06F 16/9537 715/234 |
| 8,881,281 B1* | 11/2014 | Mitchell | ............... | G06F 21/552 726/23 |
| 9,195,829 B1* | 11/2015 | Goradia | ................... | G06F 21/53 |
| 9,836,339 B1* | 12/2017 | Engers | ..................... | G06F 9/547 |
| 11,080,407 B2* | 8/2021 | Mahaffey | ................ | H04L 69/14 |
| 2007/0094260 A1* | 4/2007 | Murphy | .............. | G06F 21/6281 |
| 2015/0350174 A1* | 12/2015 | Reno | ........................ | H04L 67/10 726/3 |
| 2017/0161973 A1* | 6/2017 | Katta | ..................... | G07C 5/085 |
| 2018/0027006 A1* | 1/2018 | Zimmermann | ........... | G06F 9/46 726/11 |
| 2018/0278635 A1* | 9/2018 | Shin | ....................... | G06N 20/00 |
| 2018/0375638 A1* | 12/2018 | Khanna | .................... | G06N 3/08 |
| 2019/0066216 A1* | 2/2019 | Teixeira | ............... | G06Q 20/127 |

FOREIGN PATENT DOCUMENTS

CN 109284584 A * 7/2017 ........... G06F 21/121

* cited by examiner

*Primary Examiner* — Ali S Abyaneh
*Assistant Examiner* — Shu Chun Gao
(74) *Attorney, Agent, or Firm* — Stradling Yocca Carlson & Rauth

(57) ABSTRACT

An API transaction management computing device is provided that receives an API request from a source node and obtains an API response from a destination node. The device includes a receiving module configured to receive the API request from the source node, a scoring module configured to determine an assessment score based on information associated with the API request including information about a digital identity associated with the API request and match the assessment score to an actions rule comprising controlling deliverability, messaging, and content of the API request, and a transmission module configured to perform actions of the actions rule by controlling deliverability, messaging, and content of the API request to a destination node and the API response to a transmitting source node.

23 Claims, 8 Drawing Sheets

SYSTEM FOR REDUCING APPLICATION PROGRAMMING INTERFACE (API) RISK AND LATENCY

BACKGROUND OF THE INVENTION

Field of the Invention

The present invention relates generally to systems providing application programming interface (API) management, and more specifically, to reducing risk associated with API transactions with minimal effect to overall system performance.

Description of the Related Art

APIs in general represent tools and protocols used in coding software. More specifically, an API is a set of commands, functions, protocols, and objects used to create software or connect to and interact with other internal and external system(s). APIs provide standard commands and a method of communication used to perform common operations without the need to continually write code to perform relevant functions.

Systems providing an API provide data to other systems for use. In doing so, a system will use an API to publish data to other system(s) while the other systems (API clients) use data from the same API. Prior API deployment or API management solutions have attempted to make sharing data easy, at the expense of security. Ease of use and security have always been at odds.

API security generally, and API access control more specifically, has presented a number of security issues. API access controls provided by API management solutions to API clients have generally been regulated through simple credentialing—a Client ID and Client Secret, the equivalent of a username and password for user interactions. A more modern approach substitutes an OAuth 2.0 token for the Client ID and Secret, effectively tying the two values into one. When an API client makes a request to an API source, the API client passes one of these simple credentials. If accepted, the API source processes the API request with little or no additional security checks regarding the context of the digital identity of the requestor. In essence, the token gets you in, regardless of who you are or how you obtained the token.

Some security features have been added, including scanning message content for parameter attacks. Evaluation of a digital identity or identities making or involved in the API request is rarely performed, if ever, primarily due to the inherent delay. Digital identity evaluation has traditionally required transmitting information to a separate system for evaluation, a process which increases latency.

Current API management is limited in that actions include a single standard security action to take place when a risk is identified, such as limiting transmission rate or dropping a connection.

A typical transaction may be similar to the following. Application W may be employed on Device X and may request data from API Y published by Application Z. Device X has traditionally transmitted a credential or token together with a request to API Y. API Y may be located at, for example, Device A. Once Device A receives and verifies the credential or token, Device A transmits API Y data to Device X for use with Application Z.

One issue with this arrangement is that of risk, in that a credential or token grants full access. Current API management systems do not evaluate other relevant factors, called contextual factors. API management systems have only done so in limited instances, and then use a separate system to perform the evaluation. As a result, if Application W's access credentials or token for API Y fall into a bad actor's hands, the bad actor now has access to data approved for Application W.

There currently is no single system that provides API management functionality, content scanning for parameter attacks, and contextual scanning for identity attacks.

It would be highly beneficial if the issues associated with systems deploying APIs to users, including risk and latency issues, could be reduced or even eliminated in a non-disruptive manner to other hardware and software currently employed in computing system environments.

SUMMARY OF THE INVENTION

The present design, in one embodiment, may therefore include an API transaction management computer device comprising processor circuitry and a memory, comprising a receiving module configured to receive an API request, a scoring module configured to generate an assessment score based on information associated with the API request including information about a digital identity associated with the API request and match the assessment score to an actions rule, and a transmission module configured to perform actions of the actions rule by controlling deliverability, messaging, and content of the API request to a destination node and the API response to a transmitting source node based on available information.

According to a further embodiment, there is provided an API transaction management computing device comprising processor circuitry and a memory and configured to receive an API request from a source node and obtain an API response from a destination node, comprising a receiving module configured to receive the API request from the source node, a scoring module configured to determine an assessment score based on information associated with the API request including information about a digital identity associated with the API request and match the assessment score to an actions rule comprising controlling deliverability, messaging, and content of the API request, and a transmission module configured to perform actions of the actions rule by controlling deliverability, messaging, and content of the API request to a destination node and the API response to a transmitting source node.

Alternately, there is provided an API transaction management computing device configured to receive an API request from a source node and obtain an API response from a destination node, comprising a receiving module configured to receive the API request from the source node, a scoring module configured to determine an assessment score based on information associated with the API request including information about a digital identity associated with the API request and match the assessment score to an actions rule comprising controlling deliverability, messaging, and content of the API request, and a transmission module configured to perform the actions of the actions rule by controlling deliverability, messaging, and content of the API request to a destination node and the API response to a transmitting source node.

These and other advantages of the present invention will become apparent to those skilled in the art from the following detailed description of the invention and the accompanying drawings.

BRIEF DESCRIPTION OF THE DRAWINGS

For a more complete understanding of the present disclosure, reference is now made to the following figures, wherein like reference numbers refer to similar items throughout the figures.

Figure 1:
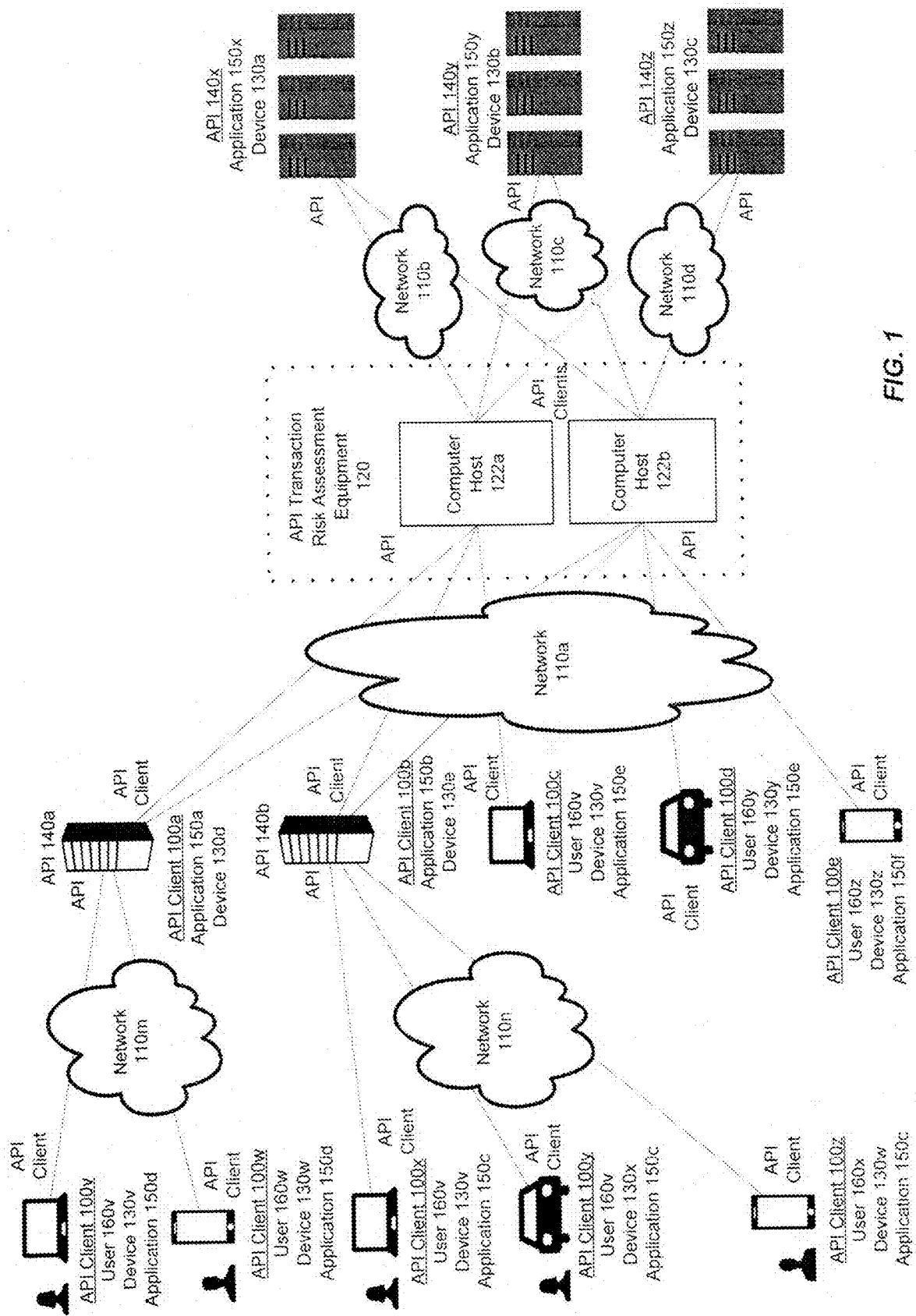
FIG. 1 is a representation of the overall system including API transaction risk assessment hardware.

The exemplification set out herein illustrates particular embodiments, and such exemplification is not intended to be construed as limiting in any manner.

DETAILED DESCRIPTION OF THE INVENTION

The following description and the drawings illustrate specific embodiments sufficiently to enable those skilled in the art to practice the system and method described. Other embodiments may incorporate structural, logical, process and other changes. Examples merely typify possible variations. Individual components and functions are generally optional unless explicitly required, and the sequence of operations may vary. Portions and features of some embodiments may be included in or substituted for those of others.

In general, the present invention is broadly directed to a system that considers contextual information about digital identities related to an API transaction when deciding both risk of delivery and time associated with delivery and optimization thereof. The present design stores and analyzes information about a combination of identity types for API requesters and requesting devices to assess risk. In one instance, an API client may be comprised of a device with its digital identity and an application with a separate digital identity. The application and device requesting the API each have a level of risk associated with the request for access. The combined risk of application and device may differ from each risk individually. In certain instances, the present design may evaluate the risk of a number of digital identities, the application, device, and user, making an API call to determine risk and may refrain from delivering the API or may alter delivery, provide warnings, or otherwise act to minimize risk.

The system does not employ a distributed arrangement of devices to control access to or manage APIs, but instead employs a single device to minimize performance impact and latency. The system employs, at a single device, local storage of authentication, threat information, and other contextual information. Such a system also may provide two stages of API evaluation, including evaluating when a request is transmitted from a source to a destination and evaluating a second time when transmitting from the destination to the source for execution. Such evaluation at a single device reduces risk and latency.

Thus the present design, in one embodiment, may include an API management computer device comprising processor circuitry and a memory, including a receiving module configured to receive an API request, a scoring module configured to generate an assessment score based on contextual information about a digital identity involved with the API request and content within data packet of the API request and match the assessment score to an actions rule, a transmission module configured to enact the actions configured within the rule, where actions control deliverability, messaging, and content of the API request to the receiving destination node and the API response to the transmitting source node based on available information.

In accordance with the foregoing, the receiving module, scoring module, and transmission module may be located on a single device. The receiving module may communicate with an API client using existing standards and/or protocols, including but not limited to TCP, UDP, IPv4, IPv6, uIP, HTTP, AMQP, COAP, MQTT, STOMP, XMPP, DDS, LLAP, Websocket, REST, SOAP, and Node. The scoring module may perform a sequential series of queries and assign action sets based on answers to the sequential series of queries. Queries may be performed locally on the API management computer device, either in memory or from disk. The scoring module may be configured to compare contextual information obtained from a digital identity originating an API request from a transmitting source node. Contextual information obtained may be from a digital application identity including but not limited to a browser user-agent, operating system, application ID, application credentials, application plugins, application fonts, application cookie, application local storage, protocol type, or otherwise. Contextual information obtained may alternately be from a digital user identity including but not limited to a user name, email address, authentication credentials, social ID, date of birth, and so forth obtained from a user, user device, or trusted source. Contextual information may alternately be provided from a digital device identity including but not limited to an IP address, Internet service provider, system fonts, SSL certificate, location, and so forth. Contextual information about any digital identity type may be behavioral in nature with regard to previous interactions with the system including but not limited to authentication success and failure history, rate of interaction history, location history. The system may obtain contextual information from multiple identity types and evaluate the contextual information independently or in combination.

The scoring module may be configured to evaluate whether a network address of the transmitting source node is associated with a specific location, may be configured to evaluate a network address threat type, and/or may be configured to compare a network address of the transmitting source node against a network list, e.g. blacklist or whitelist. The scoring module may be configured to evaluate whether the API request by a digital identity or a number of digital identities, individually or in combination, meets an acceptable level of trust based upon previous interactions with the system. The scoring module may compare content within the data packet of the API request from the transmitting source node, may compare content within the data packet of the API response from the transmitting source node, and/or may make an overall assessment of threat level based on multiple weighted factors, matching the overall assessment to an action set indicating actions to be taken with respect to the API request. The transmission module may drop the API request under certain circumstances or in some instances may pass the API request unaltered. The transmission module may rewrite the API request to another hostname, such as a honeypot. Alternately, the transmission module may send a message to a device, a user, or an application using a desired method (syslog, email, SMS, API, etc.), or may modify content in the header or the body of the API request or response.

The overall arrangement is illustrated in FIG. 1. From FIG. 1, API clients may represent multiple digital identities. Shown in FIG. 1 are API clients 100*a*, 100*b*, 100*c*, 100*d*, 100*e*, 100*v*, 100*w*, 100*x*, 100*y*, and 100*z*. Each of these API clients represents a digital identity when requesting data, including user identities 160*v*, 160*w*, 160*x*, 160*y* and 160*z*, device identities 130*d*, 130*e*, 130*v*, 130*w*, 130*x*, 130*y*, and 130*z*, and application identities 150*a*, 150*b*, 150*c*, 150*d*, 150*e*, and 150*f*. FIG. 1 shows many different types of digital identities including devices (laptops, automobiles, mobile devices, servers), users (administrators, consumers, security, developers) and applications (ride sharing, financial, realtor, etc.) This representation is not exhaustive and multiple types of digital identities, each with respective subtype(s), may be represented. API clients such as API client 100*a*, 100*b*, 100*c*, 100*d*, and 100*e* may make standard API requests via a network, shown in FIG. 1 as network 110*a*, to equipment 120, which may be API transaction risk assessment equipment. Equipment 120 may include a number of devices, with two shown in FIG. 1, namely computer host 122*a* and computer host 122*b*. In one embodiment, each computer host includes or has independent access to all relevant information, including all contextual information derived and collected as discussed herein with respect to API clients and information within the request. Thus the fact that an API client, such as API client 100*c*, makes an API request originating from user 160*v*, using application 150*e* on device 130*v* can result in the system evaluating contextual information and applying access controls. If the API request passes the evaluation and the system obtains an API response and transmits the API response back to the API client, via the same single computer host or single device, such as computer host 122*a*. In this manner, latency can be reduced as there are no additional devices required to evaluate context for the API access controls.

Further from FIG. 1, applications, such as application 150*a*, may collect contextual digital identity information about API clients, such as API client 100*m*, connecting to its API, such as API 140*a*. The system may pass that contextual digital identity information within the API request from API client 100*a* to API transaction risk assessment equipment 120. Such contextual digital information may include information about user 150*m*, device 160*m*, and application 170*d*, for example. This process enables API transaction risk assessment equipment 120 to evaluate the contextual information of the digital identities being represented through API client 100*a* and the digital identities that originated the transaction request at API client 100*m*. Such operation may provide a more accurate evaluation of risk within the complete transaction originating between API client 100*m* and the data being served from the last API within this chain, in this case API 140*x*. This representation is not exhaustive, and the system may evaluate digital identities from multiple API clients, each representing a part of the transaction.

APIs may be available from various destination devices, including destination devices 130*a*, 130*b*, and 130*c*, shown as multiple banks of server devices in this representation. However, any devices maintaining APIs and transmitting API responses may be employed with the current design. Each of the computer hosts, namely computer hosts 122*a* or 122*b*, may contact the destination devices over a network as an API client using negotiated protocols, which may be a general network or may be a specific, limited network as shown in FIG. 1, with network 110*b* contacting destination devices 130*a*, network 110*c* connecting to destination devices 130*b*, and network 110*d* connecting to destination devices 130*c*.

Figure 2:
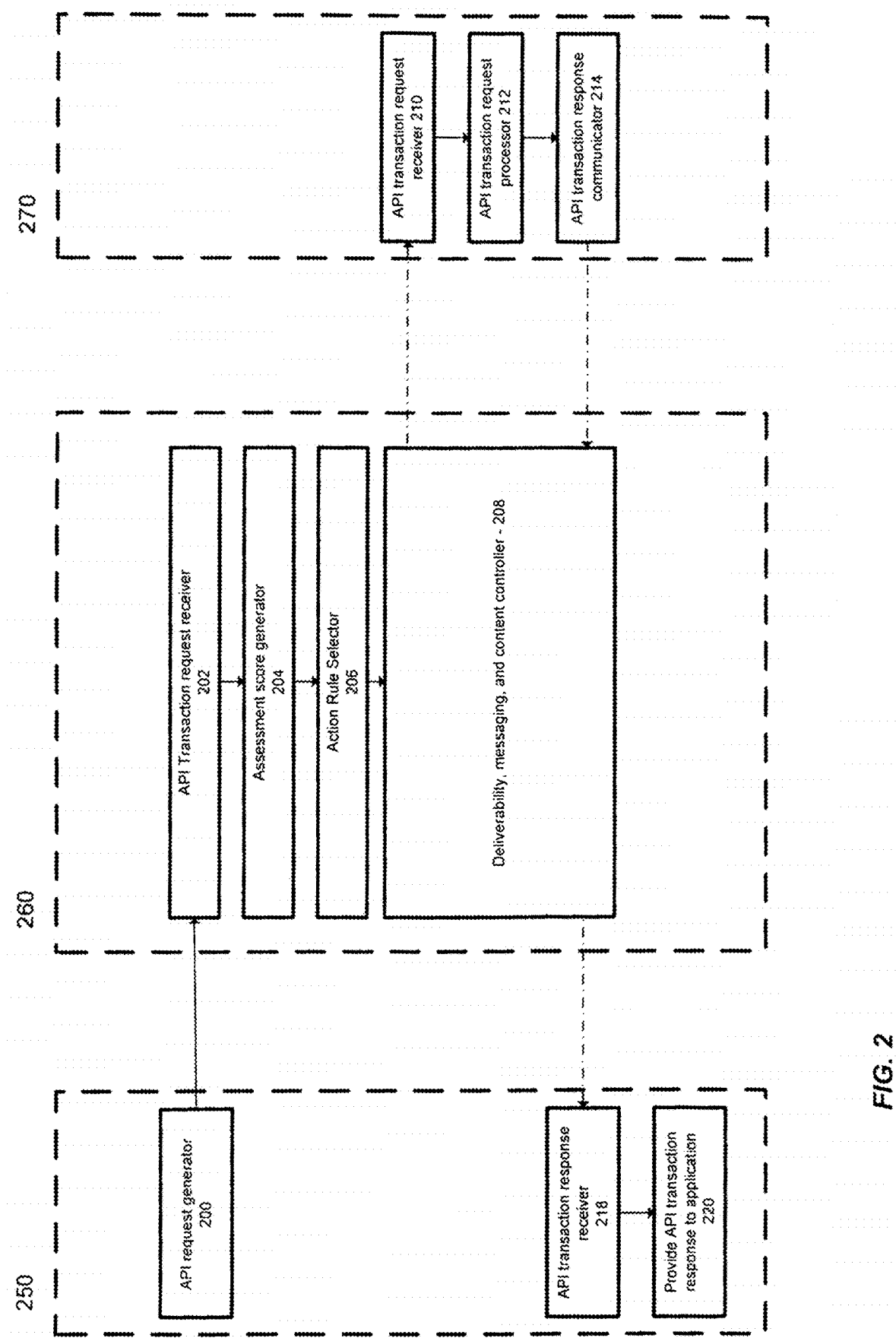
FIG. 2 illustrates the devices pertinent to the present design, including a source node, API transaction risk assessment hardware, and a destination node.

FIG. 2 shows a more detailed representation of the arrangement including functionality of the various devices of FIG. 1. API Client 250 correlates with one of the API clients 100*a-e* in FIG. 1 and employs an application that generates an API transaction request at point 200. This API request passes data, including contextual information, to API risk assessment device 260, which is similar to equipment 120 in FIG. 1. At API risk assessment device 260, the system receives the API transaction request at point 202 and generates an assessment score at point 204.

Assessment scores may be determined in various ways, but the thrust of the determination is to assess the digital identity or identities, application, device, and/or user requesting the API transaction. For example, the country where the requesting device is located or is registered may be considered. If country P is determined to be at risk, but country Q is considered to be low risk, the system may assign weights to the individual country with higher numbers being higher risk, such as 0.001 for country Q and 0.75 for country P. If the API client residing at a specific IP is known to have requested numerous APIs in a short amount of time and may be an automated process, an assessment score may be generated indicating heightened risk. Other factors may be assessed and quantified based on historic behavior and observed traits and tendencies, including but not limited to failed authentication attempts coming from the API client. The system may evaluate any digital identity, such as a user, device, or application in determining assessment scores at point 204.

At point 206, the system matches the assessment score determined at point 204 to an action rule set. The action rule set may be any action associated with obtaining an API response, including but not limited to obtaining the API response and transmitting the API response to the requester, refraining from obtaining the API response, determining further information about the requester or requesting device, storing information available, modifying data within the request or the response, querying a data source for more information, performing a messaging function like sending a log, electronic message, a separate API call, or returning a status or any other action appropriate under the circumstances. The system make act alone or in concert with other devices in effectuating the action, and the action may be to take no action based on the circumstances and the risks assessed.

In one instance, if the risk assessment is high, such as above a certain threshold, the system may issue a warning or indication to the user that the API response will not be delivered, may rewrite the request to a honeypot, or may drop the request completely. In another instance, with a low to mid level risk score, the action may be to analyze more information about the user and/or her device to make a better assessment before deploying the API response. And one such action, in the presence of a low risk assessment, may to be to simply obtain and transmit the API.

At point 208, the system controls deliverability and content of the request and potentially the response. In one instance, the request is simply passed to destination node 270 for processing. In another instance, the request may be provided with information such as in headers or in credentials or otherwise as appropriate, and the altered request may be transmitted to the destination node 270 for further processing. Thus deliverability may be altered, as well as deliverability instructions and content of the request being transmitted. FIG. 2 illustrates an optional transmission from point 208, wherein the deliverability and content of the request may have been altered, to point 216 wherein deliverability and content is further controlled. In one instance, for a high risk requester or requesting device, this optional path may be employed, bypassing destination node 270, and a warning or message may be delivered to the source node 250 rather than the requested API.

The other option for moving from point 208 is shown as the optional path from point 208 to point 210 in destination node 270. The system determines, based on the risk assessment and action rule or rules determined whether to transmit along one or the other of the optional paths from point 208. In general, if a high risk has been determined such that contacting the destination node is not desired, the system either drops the request or employs a path back to source node 250. If there is not a high risk assessment based on the transmission, the system sends the request from point 208 to point 218.

Destination node 270 receives the API transaction request at point 210 and processes the API request at point 212. At point 214, the destination node communicates or transmits the API transaction response. Irrespective of whether API risk assessment device 260 passes the request to destination node 270 or not, the request is received at point 208 and the delivery of the request governed at API risk assessment device 260. This represents a second but final opportunity to inhibit, mark, or somehow otherwise influence the delivery of the desired API. Operation includes assessing the requester and/or requester device, processing any information received from destination node 270 or other locations that expressly, or based on consideration of otherwise available information, restrict or limit delivery of the API response. For example, instructions may be received from the destination node that the API response in this instance contains specific content and should not be sent to Country F. If the requester device is associated with Country F, the API response may not be delivered, the system may modify content, and/or a warning or message provided to the requester device. Other restrictions or limitations may be applied.

If passage of the API response or information associated with the API response is approved, the API risk assessment device 260 transmits the API response to source node 250, which receives the API transaction response at point 218 and provides the API transaction response to the application at point 220. Again, this could be anything from full API functionality to a warning or error message with no API functionality.

While shown as a single module on the computer host in FIG. 2, point 208, representing the deliverability, messaging, and content controller multiple modules may be used when controlling deliverability, messaging and content of requests and responses. However, in all instances the two levels of assessment are typically performed as described herein.

Figure 3:
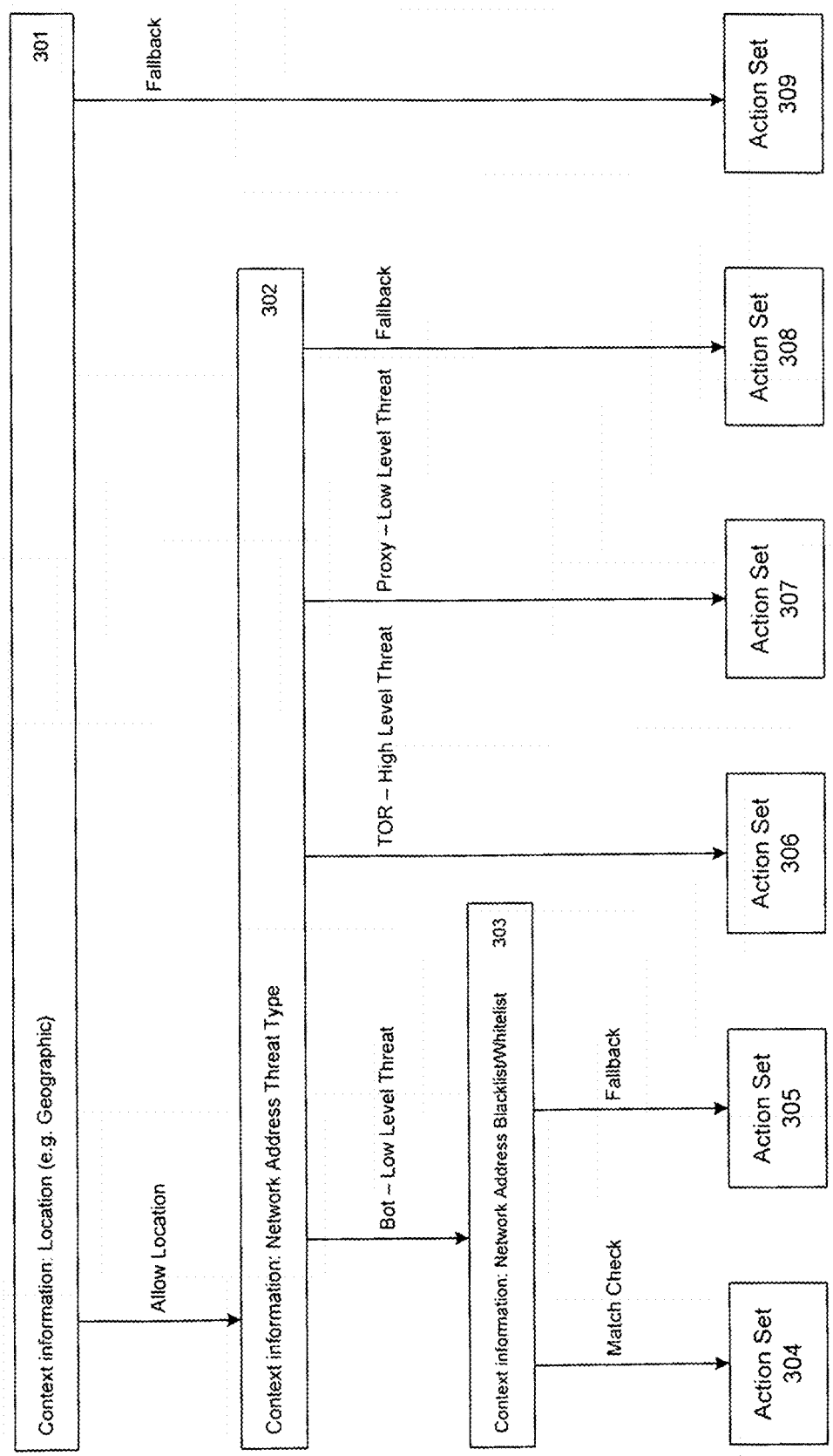
FIG. 3 illustrates functional operation of one embodiment of the system and the API transaction risk assessment hardware specifically.

FIG. 3 illustrates general determination of issues and actions in accordance with the design of FIG. 2. FIG. 3 proceeds from the top down and is only one example of the relevant functionality, and is not intended to be limiting, as numerous other determination possibilities exist. The system is not limited to the amount of, or order of, the checks for content within a transaction or context about the transaction, nor is the system limited to the amount of, or order of, matches within a check. At point 301, or first level 301, the system performs a check against data within the request or response, evaluating either specific content within the transaction or contextual information acquired from digital identities involved with the transaction. If the check does not produce a match, the system progresses to action set 309. If the check is matched at first level 301, the system makes a separate assessment of context or content at second level 302. At second level 302, the system may determine whether the matches at least one of the checks being queried. If the system finds a match in Match 1 the system will progress to third level 303. If the system locates a match at Match 2 operation proceeds to Action Set 306. If the system identifies a match at Match 3 operation proceeds to Action Set 306. As multiple matches can be made, the matches may be prioritized if only one path is to be followed and/or matches may be combined. Alternately, the system may determine the API request is from none of the foregoing and may execute action set 308.

FIG. 3 also includes action sets 304-309. Examples of action set elements include but are not limited to discarding the request and/or response, rewriting the request and/or response, modifying the request and/or response header and/or body, transmitting an email, making an API call, logging the request, such as into a system log, passing through the request, locking the client ID, key, and/or token where appropriate, modifying a threshold, rate, and/or quota, or returning a status code, such as total refusal to provide the API or restricted release of the API.

Figure 4:
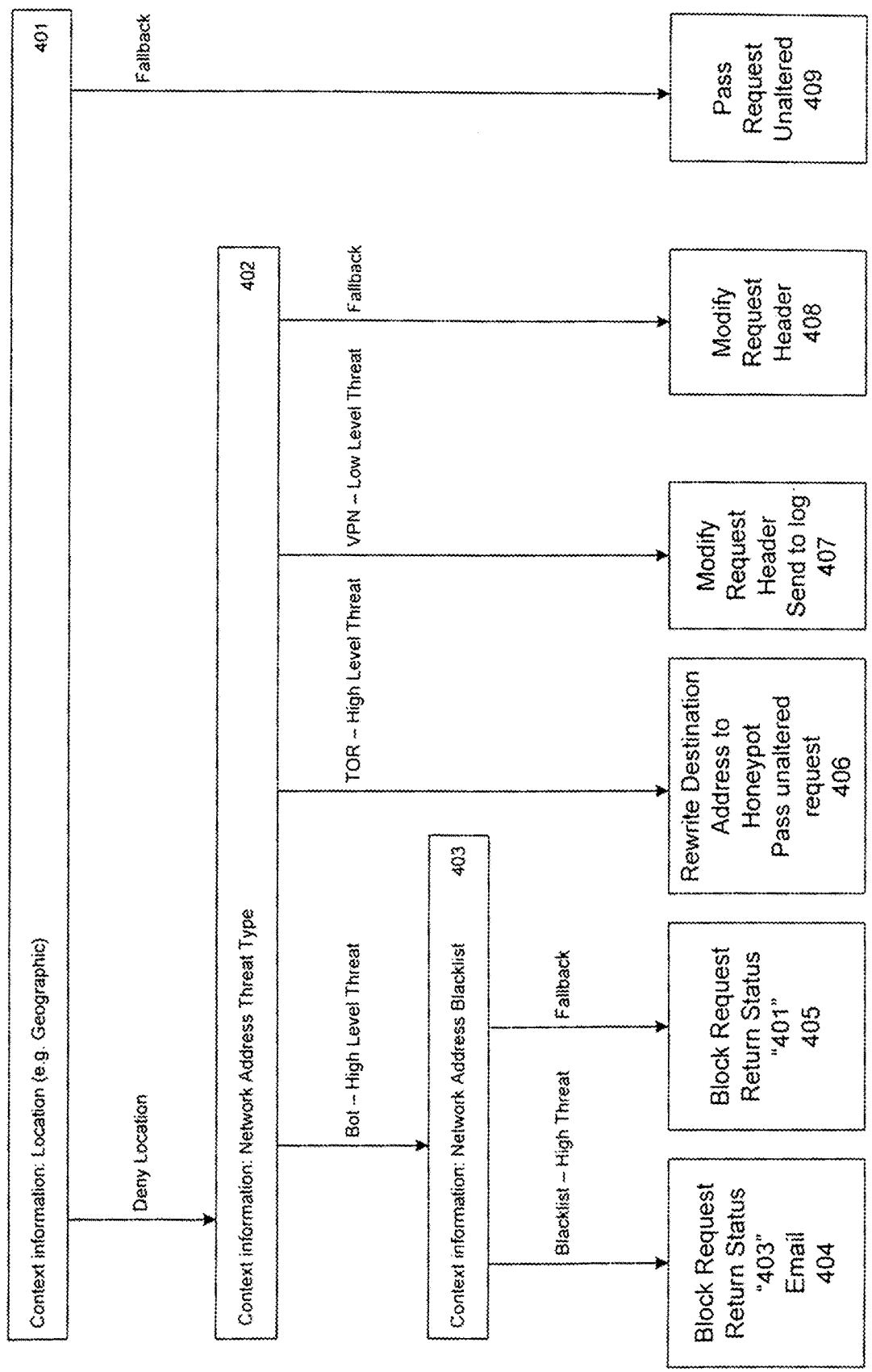
FIG. 4 is an example of functional operation of one embodiment of the system and the API transaction risk assessment hardware specifically.

FIG. 4 is an alternate representation of FIG. 3 with the "checks" configured for specific content or context checks. From FIG. 4, there is provided a similar set of three levels of evaluation, namely level 401, level 402, and level 403. At point 401, the system determines a geographic location of a user, device, or combination thereof, if such information is available, which may be more than one location. The location or country in this instance is to be matched. If the location is not matched, the system progresses to action set 409. If the location is matched at level 401, at second level 402, the system assesses the network address threat type of the device or user if such information is available. At level 402, the system may determine whether the network address is considered a "bot" threat, or automated device seeking the API in question. Alternately, the system may determine the query is a "TOR" threat, where TOR in this instance represents an "onion router" network threat wherein anonymous communication is employed by routing traffic to intermediary devices in an effort to mask the requester's identity. Alternately, the system may determine the API request is from none of the foregoing and may execute action set 408. In the case of the TOR threat, action set 406 may be executed, while in the case of a proxy threat, the system may execute action set 407.

Third level evaluation 403 consists of the system determining whether, in the case of a bot threat from an allowed location, the network address belongs to a specified list of network addresses, typically, but not limited, to act as a whitelist or blacklist. A whitelist is a list of approved network addresses while a blacklist is a list of expressly disapproved network addresses. There may of course be network addresses that are neither blacklisted nor whitelisted. If the network address matches the network address in the network address whitelist or blacklist, the system may execute an action set specific to that network address, in this case actions set 404. If the network address is not present on the network address whitelist or blacklist, the system may execute action set 405.

FIG. 4 is simply one example of hierarchy in making determinations based on, in this instance, network address, and other information may be assessed and acted upon. Different action sets may be provided based on the evaluations presented. Further, in operation, the information needed to make the evaluations, such as a network list (e.g. whitelist or blacklist), list of locations, and so forth, may be maintained or stored locally for rapid acquisition. Different levels and contexts may be employed with different options available, and information other than or in addition to network address may be evaluated.

FIG. 4 is an alternate representation of FIG. 3. From FIG. 4, there is provided a similar set of three levels of evaluation, namely level 401 evaluating location, level 402 evaluating network address threat, and level 403 may be a network address blacklist. These three levels may be referred to as checks, and as noted different checks for context and/or content may be employed. Similar evaluations to those presented in FIG. 3 may be made, such as whether the device or user is associated with a particular location and whether the network address belongs to a particular high threat blacklist. FIG. 4 lists action sets 404 through 409, wherein action set 404 is the result of a high threat, blacklisted network address and the action set includes blocking the API request, returning a status "403" indicating unavailability of the API, and sends an email to the user or otherwise informs an appropriate entity.

The system executes action set 405 when the location of the user or her device is an issue, a bot is determined by context evaluation 402, but the network address is not on the network list. In this situation, the action set calls for blocking the request and returning a "401" status indicating unavailability of the API. Action set 406 is executed by the system when the network address threat type is a TOR network address, and action set 406 calls for rewriting the destination address to a so-called "honeypot" is a function that detects, deflects, or otherwise counteracts an unacceptable API request attempt. The API request may, however, be passed by the system in action set 406. Action set 407 is taken by the system when a proxy is encountered. Action set 407 modifies the request header and may transfer the request to a log for further processing. Action set 408 is a "fallback" position, when none of the other threats are identified by the system at this level, i.e. the location is denied but the threat level is not deemed to be from a bot, TOR source or proxy threat. In this instance, the system modifies the request header to indicate the request is from a problematic location, identified as a potential threat, but it is none of the threat types being evaluated. By so altering the header, the API destination node may take action as desired and/or may further alter the header to provide further information back to API risk assessment device 260 for further processing. In one instance, the indication that the query is from a location judged to be a threat may be viewed by the API destination node as a significant threat and indicating the location in the header may provide the information from API risk assessment device 260 to the destination node. The destination node, such as destination node 270, may append a "restrict transmission" indication to the header, indicating a desire to refrain from providing the API to the user under these conditions.

Finally, if the user and/or his device is not from a location deemed to be a threat, such as based on the network address of his device, the system performs action set 409, passing the request unaltered.

Figure 5:
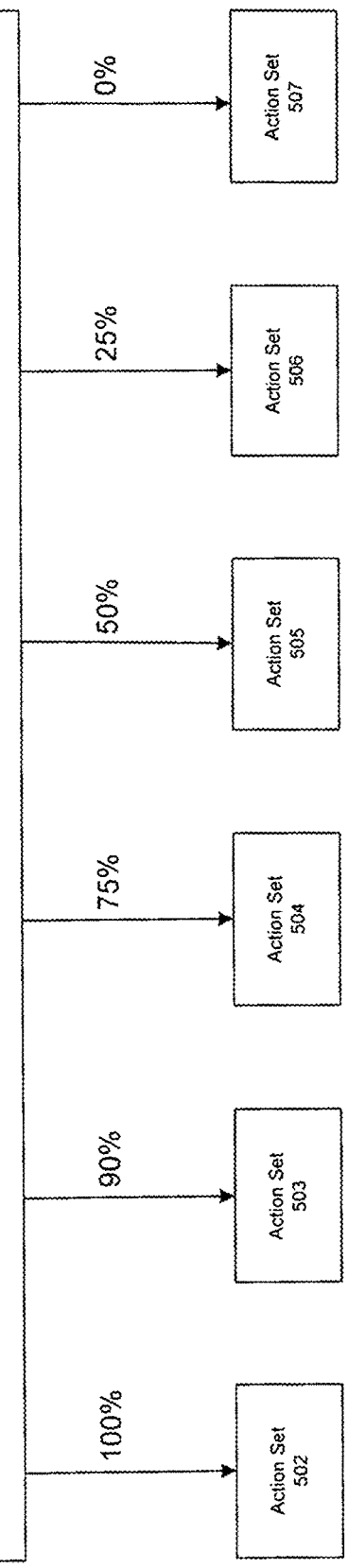
FIG. 5 shows the functional operation of a second embodiment of the system and the API transaction risk assessment hardware specifically.

FIG. 5 illustrates an alternative aspect of the design wherein a number of relevant attributes of the device are evaluated at one time in a single check. The attributes being evaluated in FIG. 5 are not limited and can be any number of attributes of content within or context about the transaction request or response. In addition, this type of check may be performed multiple times in any transaction prior to being directed to an action set. In the limited representation of FIG. 5, the API request, once received, undergoes evaluation by the system, such as API risk assessment device 260, for a number of content and context checks to obtain a check assessment score. Again, the system checks contextual information of digital identities involved with the transaction and content within the data packet for specified attributes. Weightings may be applied to the categories offered, and different categories and different numbers of checks or alternate checks from those shown in FIG. 5 may be evaluated by the system. Once weighted and an assessment score determined, the system may direct the request or response to an appropriate subsequent check or action set, where in this representation the request is directed to action sets 502 through 507, with values of 100% representing a request with the highest possible threat, to 0% representing a request having no threat risk. The score of 0% causes the system to execute action set 502, while a score of 100% causes the system to execute action set 507. The percentages assigned may vary as desired, and the values and representations in FIG. 5 are one example of how a weighted score may be separated to achieve different checks or action sets based on calculated risk.

Figure 6:
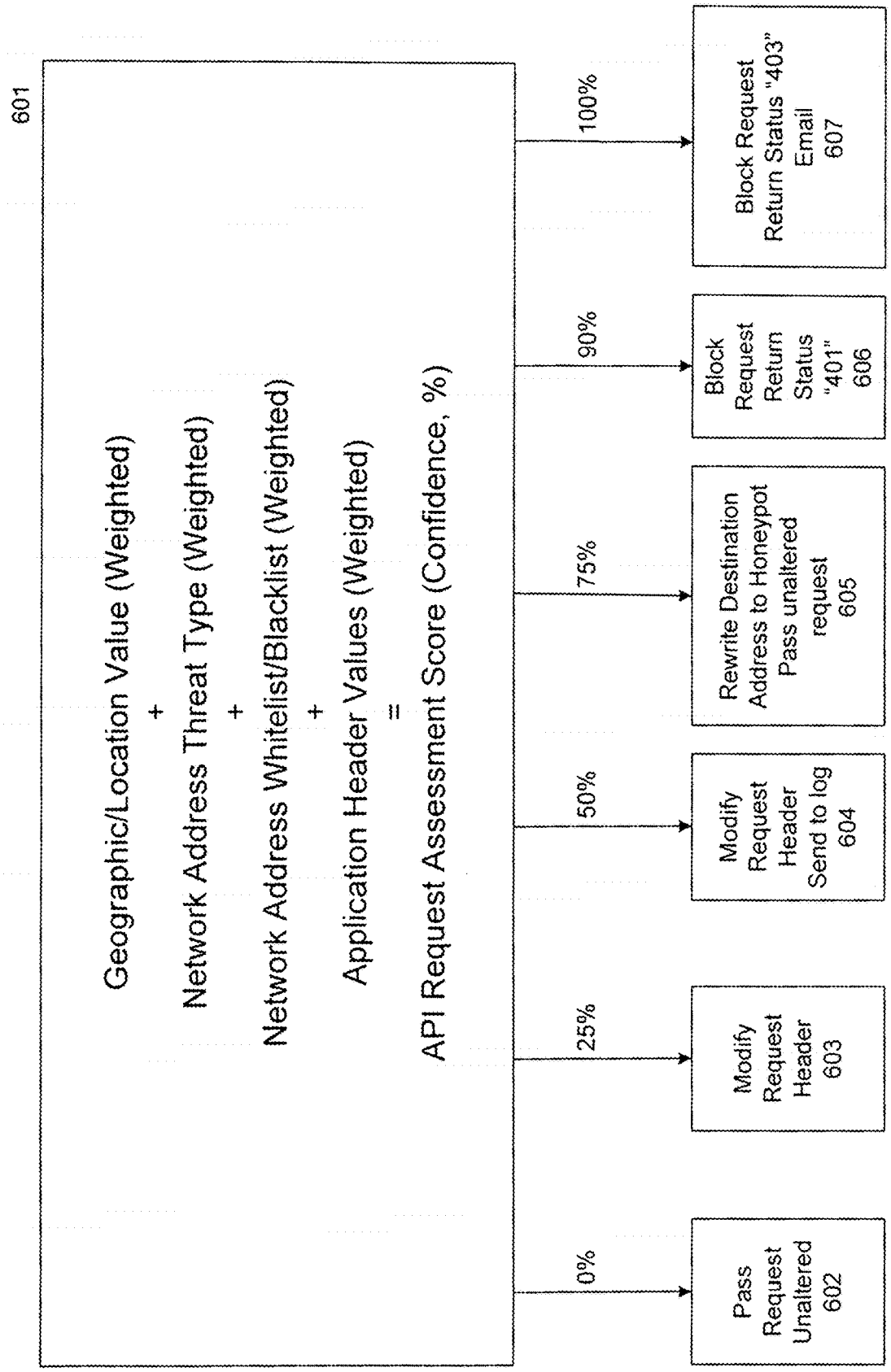
FIG. 6 shows an example of the functional operation of the second embodiment of the system and the API transaction risk assessment hardware specifically.

FIG. 6 is a further representation of the system providing composite scoring wherein multiple factors are analyzed and weights applied. Depending on the resultant score, in certain ranges as provided, the system executes different action sets. Expanding on FIG. 5, the system representation of FIG. 6 evaluates and applies weightings to geographic location, network address threat type, network address list, application header, previous behavior and computes a request assessment score, or level of confidence in the API query at a value between 0 and 100%. Weightings may be distributed based on circumstances. In certain circumstances, geographic location may be given a low weight while presence on a blacklist or whitelist may be given a relatively high weighting. Network list values may be given different weightings, and even within these network lists, different weights may be given under different circumstances, such as presence on a blacklist for reason V, such as blacklisted for 100% known threats coming from the network address of the API request, is given a relatively high negative weighting while presence on the blacklist for reason W, such as blacklisting the network address due to repeated API requests in a short period of time, is given a lower negative weighting.

In this situation, a score of 0%, representing a lowest level of risk in the API request and the system executes action set 602, passing the request unaltered. A score of 25% in this example causes the system to execute action set 603, modifying the request header to possibly indicate the threat presented or pass other information to either the destination node or the source node. A score of 50% causes the system to execute action set 604, modifying the request header and passing the network address to a log, such as the system log. A score of 75% causes the system to execute action set 605, wherein the system rewrites the destination endpoint to a "honeypot," and the request passes unaltered, while a score of 90% in this example causes the system to execute action set 606, with the system blocking the request and returning a status error, or status 401, to the requesting device. A score of 100% represents a highest level of risk and causes the system to execute action set 607, blocking the request, returning a status "403" to the user, indicating a "fatal" type error, and sending an email to the user and/or system administrator and/or appropriate entity.

While certain values such as 25%, 50%, 75% and 90% are shown in FIG. 6, more or fewer score values may be accounted for, with associated checks or action sets created, and the system may interpret intermediate values as desired. In one instance, a resultant calculated score, including weightings, of 57% may be treated as being closer to 50% than 75% and may be accorded action set 605, for the 50% score category. In other instances, the fact that the value is above 50% but below 75% may be treated as always being 50% or always being 75% depending on desired outcome. In some instances, the scores and action sets may be blended where appropriate; in the case of a 57% score, 7/25 of the 75% action set may be employed, or certain parts of the action set employed, with 18/25 of the 50% action employed, or some other calculation or assessment performed based on the score so computed.

Figure 7:
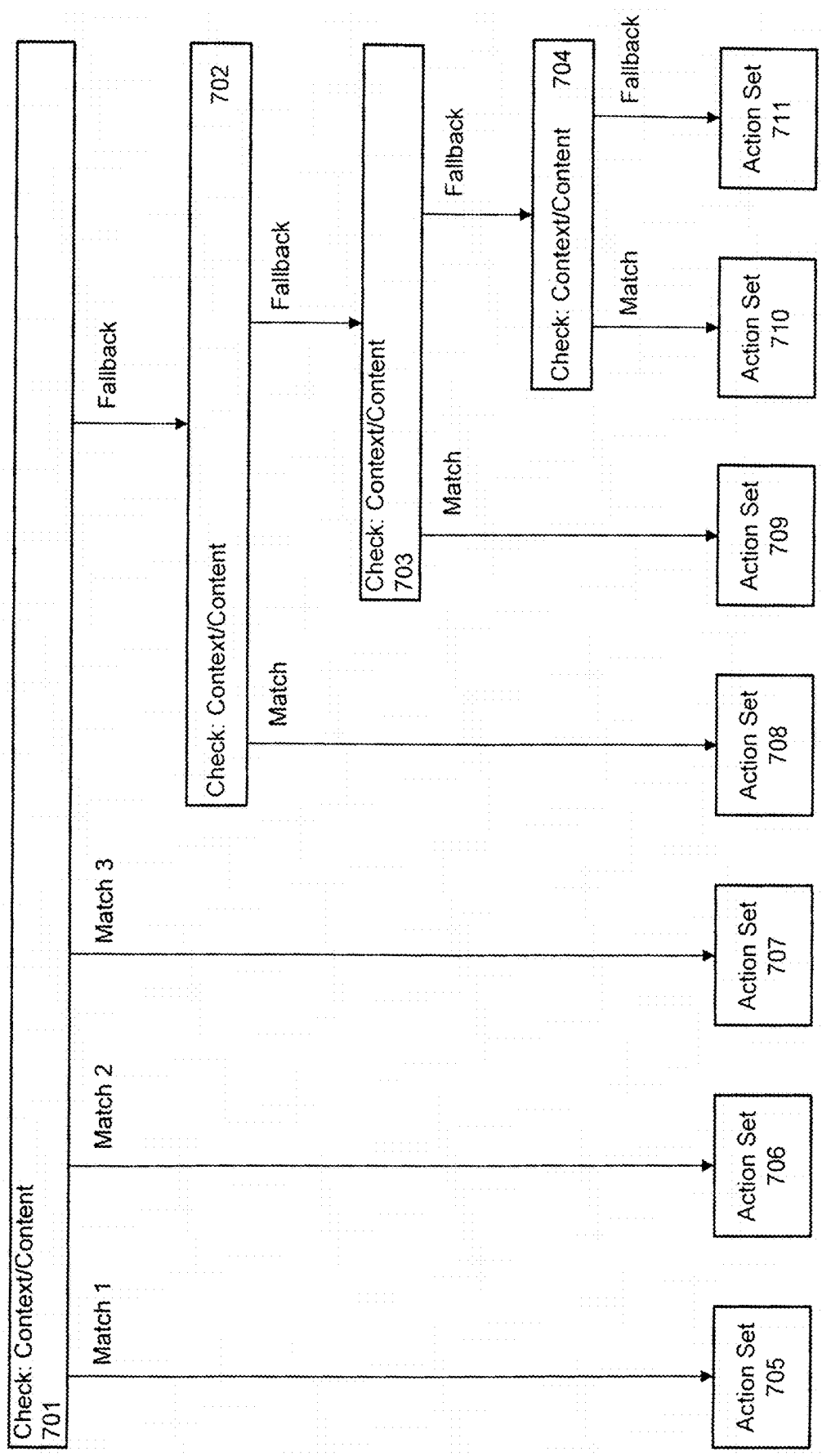
FIG. 7. illustrates a further representation of operation according to a third embodiment of the current design.

FIG. 7 is a further example of processing in accordance with the teachings presented herein. From FIG. 7, four evaluations 701-704 are presented, including four different checks of context and/or content of the API request. In this representation, three separate matches may result from check 701, labeled as Match 1, Match 2, and Match 3. Failing these matches, the system may transition to evaluation 702, then evaluation 703, and finally evaluation 704. Matches in each of these checks 702-704 may cause operation to transition to action sets 708-710, with an ultimate fallback causing the system to transition to action set 711. Thus a single level of evaluation can result in different assessments of different factors and can cause the system to transition to one from a number of optional action sets.

Figure 8:
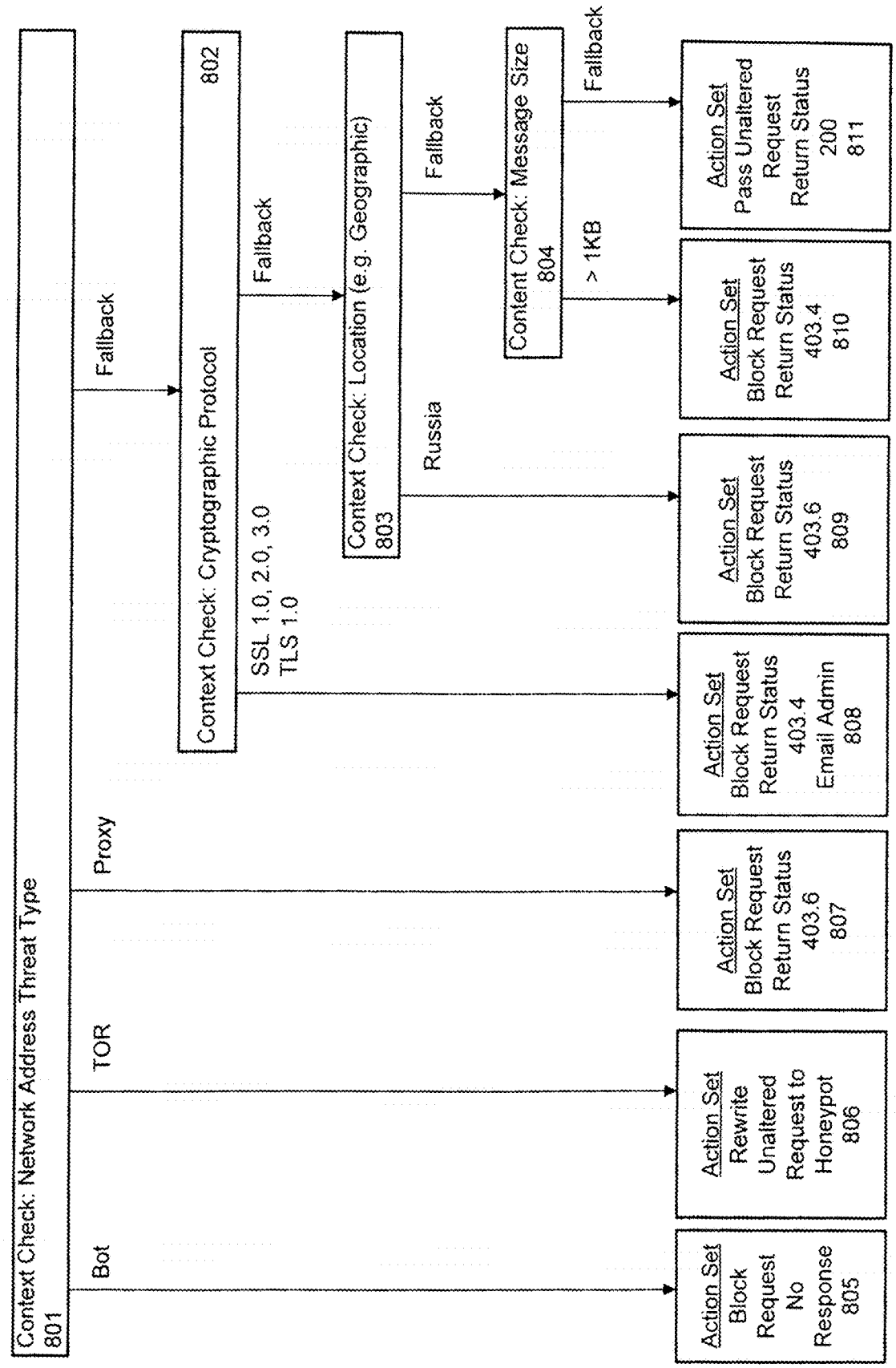
FIG. 8 shows an example of the functional operation of the third embodiment of the system.

FIG. 8 illustrates one example of operation similar to the representation presented in FIG. 7. From FIG. 8, evaluation 801 checks the context of the network address threat type, with three possibilities presented, Bot, TOR, or proxy. If the network address threat type is Bot, the system executes action set 805, blocking the request and providing no response. A TOR network address threat results in action set 806, rewriting the unaltered request to a honeypot. A proxy network address threat causes the system to execute action set 807, blocking the request and returning a status 403.6 message. If the API request is none of a bot, TOR, or proxy threat, the system transitions to evaluation 802, checking cryptographic protocol. If the cryptographic protocol is SSL 1.0, 2.0, 3.0, or TLS 1.0, the system executes action set 808, blocking the request and returning a status 403.4 message. Otherwise, the system performs evaluation 803, a geographic location check for, in this instance, a request coming from a location in Russia. If the location is Russia, the system executes action set 809, blocking the request and issuing a return status 403.6 message. If none of the foregoing checks yield positive results, and the API request is not from a bot, TOR, proxy, have cryptographic protocol of SSL 1.0, 2.0, 3.0, or TLS 1.0, or originate from Russia, the system performs evaluation 804, checking message size as to whether the message is greater than 1 kB. If so, the system executes action set 810, blocking the request and returning status 403.4. If the message size is less than 1 kB, the system executes action set 811, passing the request unaltered and returning status 200.

In the foregoing manner, the system provides for a more rapid and accurate assessment of threat risk and response to the risk, using a single device with local queries, thereby reducing latency and improving overall performance.

Thus there is provided an apparatus, comprising an API transaction management computer device comprising processor circuitry and a memory, comprising a receiving module configured to receive an API request, a scoring module configured to generate an assessment score based on information associated with the API request including information about a digital identity associated with the API request and match the assessment score to an actions rule, and a transmission module configured to perform actions of the actions rule by controlling deliverability, messaging, and content of the API request to a destination node and the API response to a transmitting source node based on available information.

According to a further embodiment, there is provided an API transaction management computing device comprising processor circuitry and a memory and configured to receive an API request from a source node and obtain an API response from a destination node, comprising a receiving module configured to receive the API request from the source node, a scoring module configured to determine an assessment score based on information associated with the API request including information about a digital identity associated with the API request and match the assessment score to an actions rule comprising controlling deliverability, messaging, and content of the API request, and a transmission module configured to perform actions of the actions rule by controlling deliverability, messaging, and content of the API request to a destination node and the API response to a transmitting source node.

Alternately, there is provided an API transaction management computing device configured to receive an API request from a source node and obtain an API response from a destination node, comprising a receiving module configured to receive the API request from the source node, a scoring module configured to determine an assessment score based on information associated with the API request including information about a digital identity associated with the API request and match the assessment score to an actions rule comprising controlling deliverability, messaging, and content of the API request, and a transmission module configured to perform the actions of the actions rule by controlling deliverability, messaging, and content of the API request to a destination node and the API response to a transmitting source node.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. An apparatus, comprising:
   an Application Programming Interface (API) transaction management computer device comprising processor circuitry and a memory, comprising:
   a transaction request receiver configured to receive an API request;

a transaction request processor configured to generate an assessment score based on information about a digital identity associated with the API request and match the assessment score to an actions rule, wherein the assessment score represents a level of confidence in the API request, wherein the transaction request processor generates the assessment score based on:
whether a requestor transmitting the API request has made numerous API requests in a short amount of time, the numerous API requests made in the short amount of time indicating the requestor comprises a software application running automated tasks; and
geographic location of the requestor transmitting the API request; and
a transmission response communicator configured to perform actions of the actions rule by controlling deliverability, messaging, and content of the API request to a destination node and the API response to a transmitting source node based on available information.

2. The apparatus of claim 1, wherein the transaction request receiver, the transaction request processor, and the transmission response communicator are located on a single device.

3. The apparatus of claim 1, wherein the transaction request receiver communicates with an API client using at least one protocol.

4. The apparatus of claim 3, wherein the sequential series of queries comprises at least one query about a network address of the transmitting source node.

5. The apparatus of claim 1, wherein the transaction request processor performs a sequential series of queries and assigns action sets based on answers to the sequential series of queries.

6. The apparatus of claim 1, wherein the scoring module is configured to evaluate whether a network address of the transmitting source node is associated with an unacceptable location.

7. The apparatus of claim 1, wherein the transaction request processor is configured to evaluate a network address threat type.

8. The apparatus of claim 1, wherein the transaction request processor is configured to compare a network address of the transmitting source node against a blacklist or whitelist.

9. The apparatus of claim 1, wherein the transaction request processor is configured to evaluate whether the API request by at least one digital identity meets an acceptable trust level based upon previous interactions.

10. The apparatus of claim 1, wherein the transaction request processor is configured to make an overall assessment of threat level based on multiple weighted factors and match the overall assessment to actions to be taken with respect to the API request.

11. The apparatus of claim 1, wherein the API transaction management computer device is configured to authenticate the API request.

12. An Application Programming Interface (API) transaction management computing device configured to receive an API request from a source node and obtain an API response from a destination node, comprising:
a transaction request receiver configured to receive the API request from the source node;
a transaction request processor configured to determine an assessment score representing a level of confidence in the API request, the assessment score based on information about a digital identity associated with the API request, and further configured to match the assessment score to an actions rule comprising controlling deliverability, messaging, and content of the API request, wherein the transaction request processor generates the assessment score based on:
whether a requestor transmitting the API request has made numerous API requests in a short amount of time, the numerous API requests made in the short amount of time indicating the requestor comprises a software application running automated tasks; and
geographic location of the requestor transmitting the API request; and
a transmission response communicator configured to perform actions of the actions rule by controlling deliverability, messaging, and content of the API request to the destination node and the API response to the source node;
wherein the API transaction management computing device comprises processor circuitry and a memory.

13. The API transaction management computing device of claim 12, wherein the transaction request receiver, the transaction request processor, and the transmission response communicator are located on a single device.

14. The API transaction management computing device of claim 12, wherein the transaction request processor performs a sequential series of queries and assigns action sets based on answers to the sequential series of queries.

15. The API transaction management computing device of claim 14, wherein the sequential series of queries comprises at least one query about a network address of the source node.

16. The API transaction management computing device of claim 15, wherein the transaction request processor is configured to evaluate at least one of:
whether the network address of the source node is associated with an unacceptable location;
a network address threat type; and
a comparison of the network address of the source node against a blacklist or whitelist.

17. The API transaction management computing device of claim 12, wherein the transaction request processor is configured to make an overall assessment of threat level based on multiple weighted factors and match the overall assessment to actions to be taken with respect to the API request.

18. An Application Programming Interface (API) transaction management computing device configured to receive an API request from a source node and obtain an API response from a destination node, comprising:
a transaction request receiver configured to receive the API request from the source node;
a transaction request processor configured to determine an assessment score representing a level of confidence in the API request determined based on information about a digital identity associated with the API request, and further configured to match the assessment score to an actions rule comprising controlling deliverability, messaging, and content of the API request, wherein the transaction request processor determines the assessment score based on:
whether a requestor transmitting the API request has made numerous API requests in a short amount of time, the numerous API requests made in the short amount of time indicating the requestor comprises a software application running automated tasks; and geographic location of the requestor transmitting the API request; and a transmission response communicator configured to perform the actions of the actions rule by controlling deliverability, messaging, and content of the API request to the destination node and the API response to the source node;

wherein the API transaction management computing device comprises processor circuitry and a memory.

19. The API transaction management computing device of claim 18, wherein the transaction request receiver, the transaction request processor, and the transmission response communicator are located on a single device.

20. The API transaction management computing device of claim 18, wherein the transaction request processor performs a sequential series of queries and assigns action sets based on answers to the sequential series of queries.

21. The API transaction management computing device of claim 20, wherein the sequential series of queries comprises at least one query about a network address of the source node.

22. The API transaction management computing device of claim 21, wherein the transaction request processor is configured to evaluate at least one of:
   whether the network address of the source node is associated with an unacceptable location;
   a network address threat type; and
   a comparison of the network address of the source node against a blacklist or whitelist.

23. The API transaction management computing device of claim 18, wherein the transaction request processor is configured to make an overall assessment of threat level based on multiple weighted factors and match the overall assessment to actions to be taken with respect to the API request.

* * * * *